E. M. HEYLMAN.
ENGINE GANG PLOW.
APPLICATION FILED DEC. 22, 1914.
1,148,088.
Patented July 27, 1915.
3 SHEETS—SHEET 2.
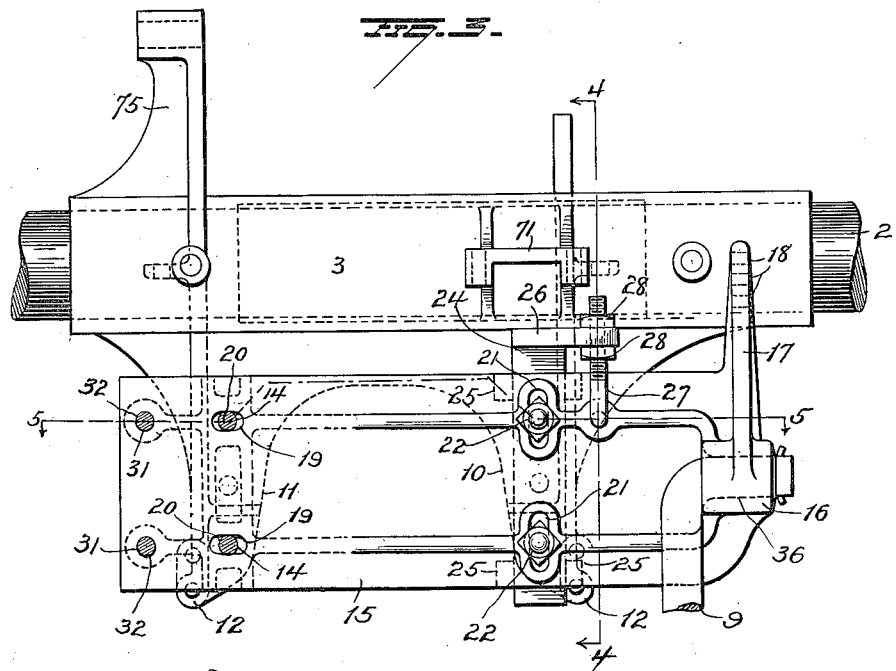
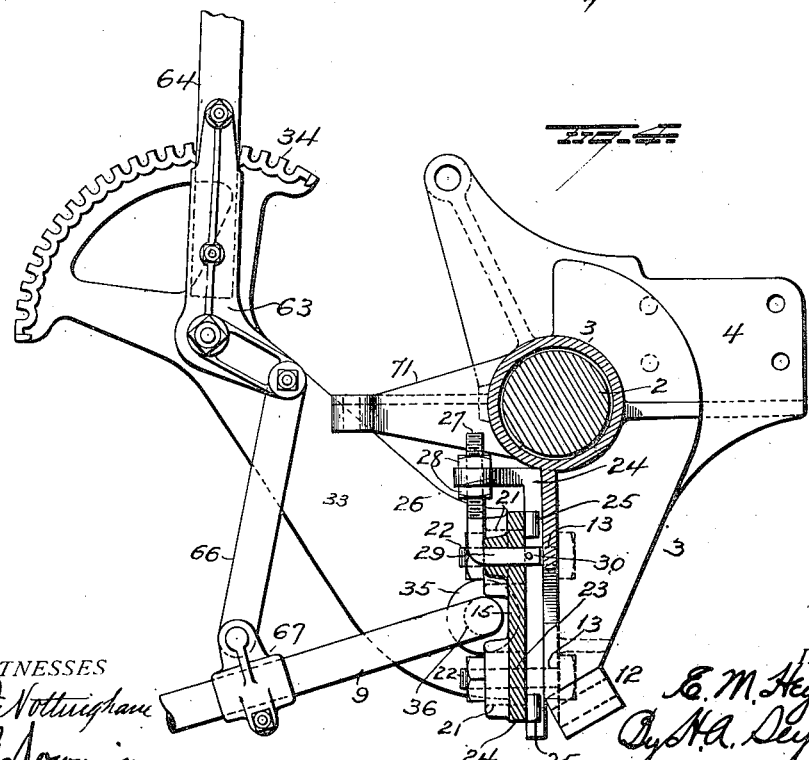
WITNESSES
E. L. Nottingham
G. F. Downing.
INVENTOR
E. M. Heylman
By H. A. Seymour
Attorney

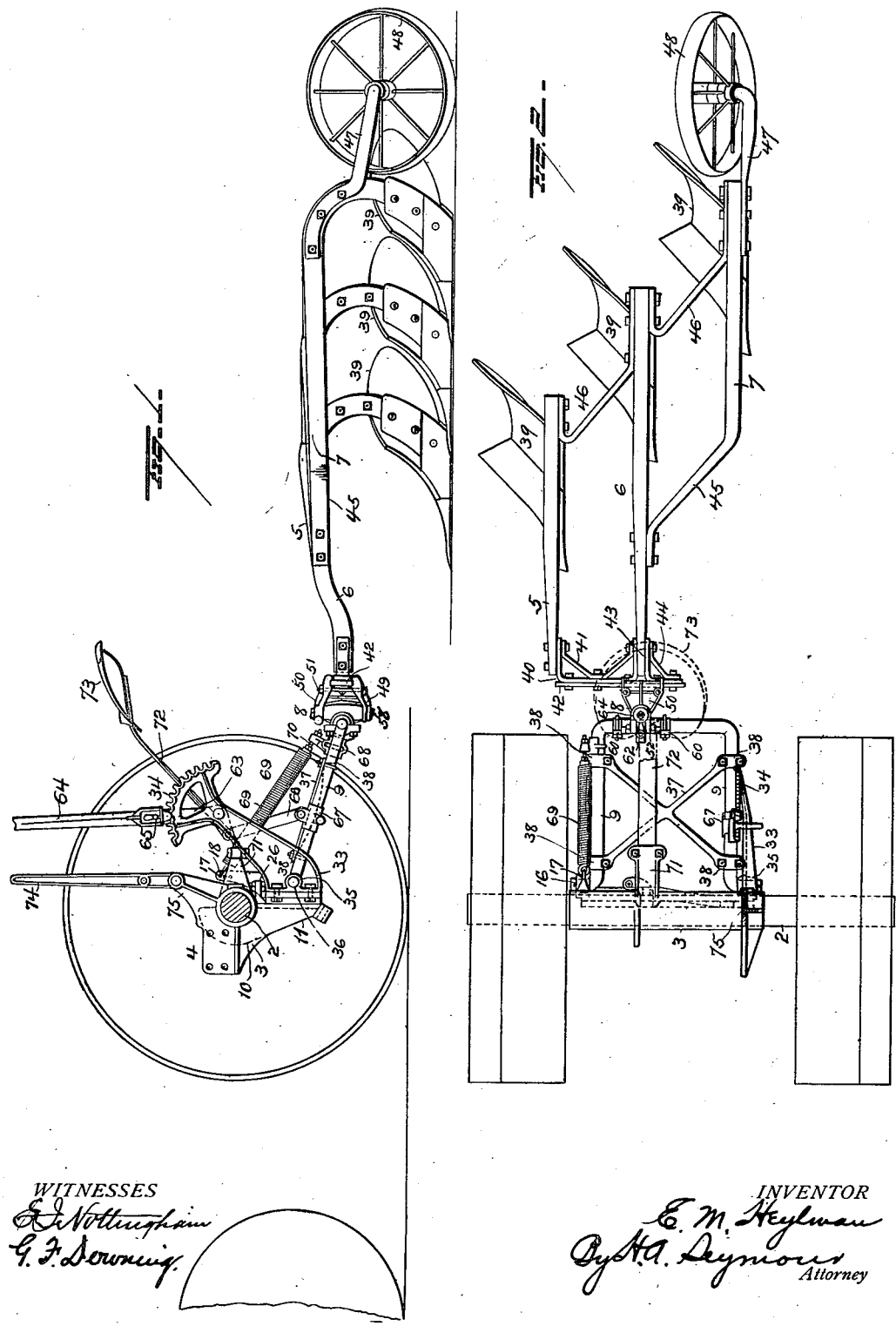

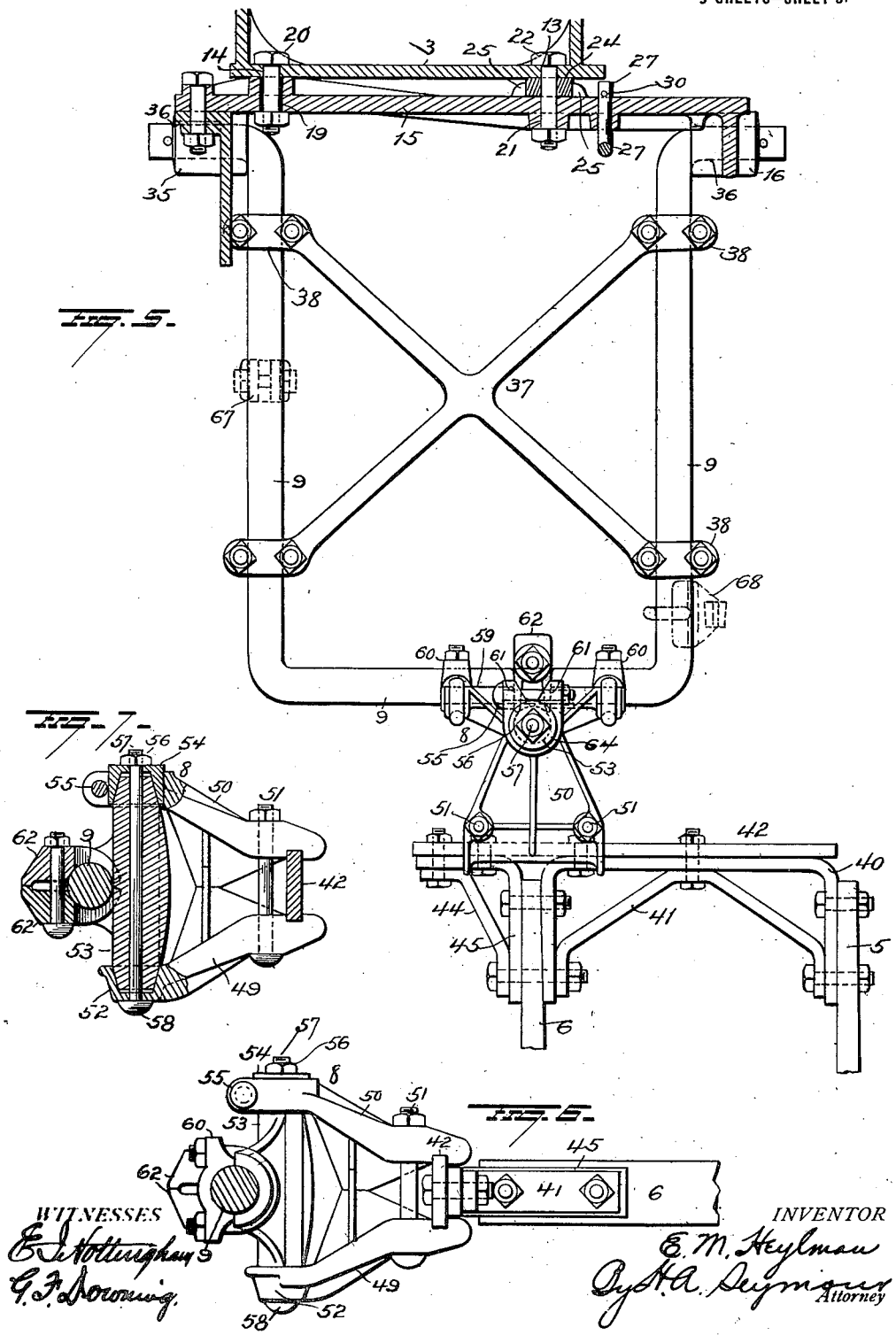

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,148,088.     Specification of Letters Patent.     Patented July 27, 1915.

Application filed December 22, 1914. Serial No. 878,535.

*To all whom it may concern:*

Be it known that I, EDWARD M. HEYLMAN, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to those of the "engine gang" type,—one object of the invention being to so construct such a plow as to minimize the draft; to simplify the construction, and to render it possible for a single operator to control the engine and also the raising and lowering of the plows, and regulating the depth.

A further object is to provide a plow structure in which the plows are connected with the tractor through the medium of a vertically adjustable bail, and to provide improved means for adjustably connecting the plows with said bail.

A further object is to provide a simple and efficient means for connecting the bail with which the plows are connected, with the tractor and to so construct such connecting means as to provide for adjustment of the bail to level the plows.

A further object is to provide simple coupling means for connecting the forward ends of the plow beams with the rear end of a draft bail, and to so construct said coupling that the same can be adjusted laterally with relation to the bail and with relation to the plows, and so that the plow beams may be raised and lowered and so that the plows may swing laterally.

With these and other objects in view the invention consists in certain novel features of construction and combinations of parts as hereinafter set forth and pointed out in the claims.

In the accompanying drawings; Figure 1 is a side elevation illustrating an embodiment of my invention; Fig. 2 is a plan view; Fig. 3 is a detail view showing the parts 3 and 15, with the parts 33 removed; Fig. 4 is a sectional view on the line 4—4 of Fig. 3; Fig. 5 is a plan view, partly in section on the line 5—5 of Fig. 3, and Figs. 6 and 7 are detail views of the coupling devices 8.

A traction engine or tractor is illustrated diagrammatically at 1,—the rear axle 2 of said tractor being mounted in a tubular casting 3 which is formed with a flange 4 to be secured to a fixed part of the engine structure. The casting 3 thus constitutes a part of the tractor.

A gang of rigidly connected plows 5, 6, 7, is attached, through the medium of coupling devices 8 and a bail or draft mechanism with the tractor and means are provided between said bail or draft mechanism and the tractor for adjusting the connection of the former with the latter to level the plows,—all as hereinafter specifically explained.

The casting 3 is made with depending ribbed arms 10—11 provided at their lower ends with integral inclined sleeves 12 for the reception of stay rods (not shown) which connect the casting with the tractor structure,—said depending arms being each provided with a plurality of holes, 13—14 respectively, for the reception of bolts as presently explained.

A ribbed plate 15 is disposed in front of the depending arms 10—11 and provided at one end with horizontal journal bearing 16 and an upwardly projecting arm 17 provided near its upper end with a plurality of holes 18. Near one end, the plate 15 is provided with horizontal elongated slots 19, and through these slots and two of the holes 14 in arm 11, bolts 20 are passed. The plate 15 is also provided with vertical slots 21, through which bolts 22 are passed, said bolts also passing through holes 23 in a vertical bracket 24 and through two of the holes 13 in the arm 10. The bracket 24 is disposed between the arm 10 of casting 3 and the plate 15 and is maintained always at right angles to the latter by means of lugs 25 on the plate. The bracket 24 is provided at its upper end with an arm 26, through which a threaded rod 27 passes and to which said rod is adjustably secured by means of jam nuts 28. The rod 27 is provided at its lower end with a short arm or hook 29 which passes through a hole in the plate 15 and is prevented from escape by means of a cotter pin 30.

Near the end of the plate 15 farthest removed from the bracket 24, said plate is provided with holes 31 for the accommodation of bolts 32, which latter serve to secure the lower end of an arm 33 to said plate. The arm 33 projects upwardly and rearwardly from the plate 15 and is provided at its upper end with a toothed segment 34 which may be made integral therewith. Near the base of the arm 33, a journal bearing 35 is provided and is in line with the bearing 16 at the opposite end of the plate 15. The parallel members of the bail 9 are formed at their rear ends with laterally projecting arms 36 mounted freely in the bearings 16 and 35, and thus the forward end of the bail is pivotally connected with the plate 15,—through the medium of which latter, the bail is connected with the tractor below the rear axle. By thus connecting the forward end of the bail or draft mechanism with the tractor, sufficient weight and draft strain will be imparted to the tractor to increase the traction of the latter and thus obviate the necessity for large spikes or cleats on the treads of the wheels. Furthermore by connecting the bail with the tractor below the rear axle, the forward guiding wheels of the tractor will be kept firmly on the ground during the operation of the plow.

It will be readily seen that as the plow beams are connected with the rear cross bar of the bail through the medium of the coupling devices 8, vertical adjustment of one side of the bail relatively to the other will operate to level the plows transversely of their line of draft, and thus such leveling adjustment may be readily effected by raising or lowering one end of the plate 15, such adjustment of the plate being permitted by means of the connections hereinbefore described between said plate 15 and bracket 24 and the arms 10—11 of the casting 3.

In order to guard against any possible distortion or twisting of the bail 9 due to torsional strain, the same may be strengthened by a brace 37 having diagonal arms secured by means of clamps 38 to the side members of the bail near respective ends thereof.

Plow bodies 39 are located at the rear ends of the beams of plows 5, 6 and 7 and the landsides of these plow bodies are made comparatively short. The beams of the plows 5 and 6 are connected at their forward ends by a spacer 40 and a brace 41, both of which are securely bolted to a horizontal bar 42,—the latter being connected with the bail, through the medium of the coupling devices 8, as hereinafter specifically pointed out. The beam of plow 6 is also secured to the horizontal bar 42 by means of braces 43 and 44. The beam of plow 7 is provided with a laterally and forwardly projecting arm 45 secured to the beam of plow 6 intermediate the ends of the same. Braces 46 are disposed between the central plow beam 6 and the other beams 5—7 and serve to keep the several plows fixedly spaced apart.

A bracket 47 is secured to the rear end of the plow beam to which the rearmost plow body is secured, and is bent laterally at its rear end to form a journal for an inclined rear wheel 48. This wheel is made to take the place of the rear end of the landside and will carry the rear ends of the plow bodies, either in raised or working positions, and said wheel is set at such angle that it will relieve the plow bodies of the land pressure, thus reducing the draft of the plow. By constructing the coupling devices 8 as presently described, the rear wheel 48 will follow the engine without sliding in making a turn.

In constructing the coupling devices 8, I provide two arms 49—50 which are adjustably clamped to the horizontal bar 42 by means of clamping bolts 51. The forward end of the lower arm 49 is made with a horizontal conical bearing 52 for the lower conical end of a pivot post 53 and the upper arm 50 is bifurcated at its forward end for the reception of a bearing block 54 for the upper conical end of said pivot post,—said bearing block being held adjustably in place by means of a clamping bolt 55, and by a nut 56 on the upper end of the bolt 57 which passes through the pivot post 53 and both bearings and is provided at its lower end with a head 58. By adjusting the block 54, compensation may be made for wear in the bearings of the pivot post.

An elongated bearing 59 is made rigid with the pivot post 53 and disposed at right angles thereto so as to receive the rear cross bar of the bail 9, pivotal or rocking connection between the bail 9 and bearing 59 being completed by means of caps 60 secured to said bearing at respective ends thereof. The central portion of the bearing 59 is slotted, as at 61, for the accommodation of a two-part clamp 62 secured to the cross bar of the bail and serving as a stop to prevent longitudinal displacement of the bearing 59 on the cross bar of the bail.

By connecting the plow with the bail in the manner above described, lateral adjustment of the plows relatively to the bail may be effected by loosening the clamp or stop 62 and then moving the bearing 59 longitudinally in one direction or the other. The horizontal pivotal connection of the coupling devices on the cross bar of the bail will permit the bail and plow beams to be raised or lowered, and the vertical pivotal connection afforded by the pivot post 53 and arms 49—50 will permit the gang of plows to swing laterally and follow the engine in making a turn. The raising and lowering of the forward ends of the plows by raising or lowering the bail 9, may be effected by the devices which will now be described.

A bell-crank 63 is pivotally mounted on the arm 33 approximately at the juncture thereof with the toothed segment 34, and to the upper arm of said bell-crank an operating lever 64 is secured and provided with a manually operable detent 65 to engage the toothed segment 34. The lower arm of the bell-crank is connected, by a link 66 with one of the side members of the bail 9,—such connection being effective through the medium of a clamp 67 secured to said member of the bail. A clamp 68 is secured to the other side member of the bail and with this clamp, one end of a balancing spring 69 is adjustably connected through the medium of a screw 70. The other end of the spring 69 is connected, at one or another of the holes 18, with arm 17 on plate 15. When a gang of three plows is used, the spring will be attached at the upper hole in arm 17, but if only two plows be used, then the spring will be attached at a lower hole in arm 17, and thus the same spring may be used for gangs of either two or three plows.

The casting 3 in which the rear axle of the engine is mounted, is provided with a rearwardly projecting arm or bracket 71 with which the forward end of a seat spring 72 is rigidly connected, a seat 73 being mounted on the rear portion of said spring so as to be so disposed as to permit the operator to be within convenient reach of the lever 64 for raising, lowering and adjusting the plows. The operator will also be within convenient reach of a lever 74 for controlling the engine, said lever 74 being pivotally connected with an arm 75 of casting 3 and connected by any suitable means (not shown) with the controlling means of the engine. Thus the entire plow structure, including the traction engine, may be easily operated and controlled by a single operator.

It will be observed that during normal operation of the plow, the bail will be locked against vertical movement, but the plows are free to rise, so that when a plow body engages an obstruction over which it may be able to ride, the plows will be caused (by such obstruction) to rise and ride over the obstruction and then again enter the ground. Should any obstruction be encountered, over which the plow bodies could not readily ride, the operator may reverse the tractor and thus back the plows away from the obstruction. He may then raise the plows and start the tractor forwardly until the obstruction shall have been passed, and then he may lower the plows to working position. Should a plow body make side or glancing contact with a stone or other obstruction, the plows will be permitted to move laterally, by reason of the vertical pivotal connection of their beams with the bail, and thus enable the obstruction to be passed without injury to the parts.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. The combination with the rear axle mounting of a traction engine, of a trailing bail pivotally connected with said axle mounting, a plow having its forward end pivotally connected with the rear end of the bail, and manually operable means supported by said axle mounting and connected with said bail for raising and lowering the plow.

2. The combination with the rear axle mounting of a traction engine, of a trailing bail pivotally connected therewith, a plow having its forward end pivotally connected with the bail, lever mechanism supported by said axle mounting and connected with the bail for raising and lowering the plow, and a seat supported by said axle mounting and located near said lever mechanism.

3. The combination with the rear axle mounting of a traction engine, of a trailing bail pivotally connected therewith, a plow having its forward end pivotally connected with the bail, a lever mechanism supported by said axle mounting and connected with the bail for raising and lowering the plow, a seat supported by said axle mounting and located near said lever mechanism, and an engine control lever also supported by said mounting so as to be located near said seat.

4. The combination with the rear axle mounting of a traction engine, of a trailing bail pivotally connected with said mounting, a plow having its forward end pivotally connected with said bail, an arm supported by said mounting, a segment at the free end of said arm, a lever mounted on said arm, and a link connecting an arm of said lever with the bail.

5. The combination with a traveling frame, of a support carried thereby, a trailing bail pivotally connected with said support, a plow pivotally connected at its forward end with the rear end of the bail, a lever mounted on the tractor, a connection between the lever and bail for raising the forward end of the plow, an arm carried by said bail support, and a spring connected at its forward end to said arm above the pivotal mounting of the bail and at its rear end to the bail in advance of the connection of the plow therewith.

6. The combination of a traction engine, of a trailing bail pivotally connected thereto, a plow pivotally connected at its forward end with the rear end of the bail, means for raising the forward end of plow, a balancing spring connected at one end with the bail in advance of the pivotal connection of the beam therewith, a part adjacent to the forward pivots of the trailing bail having a series of attaching points for the other end of the spring so that the forward end of the balance spring can be raised to give more power thereto when three plow bottoms are used, and so that the forward end of said spring may be lowered when one or two plow bottoms are used to decrease the power of said spring.

7. The combination with the rear axle mounting of a traction engine, of a trailing bail pivotally connected with said mounting, a plow having its forward end pivotally connected with said bail, a lever supported by said mounting, a link connecting said lever with one side member of the bail, a balancing spring connected with the other side member of the bail in advance of the pivotal connection of the beam therewith, and an arm carried by said mounting and with which the other end of the balancing spring is connected.

8. The combination with the rear wheel mounting of a traction engine, said mounting having a depending member, a plate secured to said depending member, a trailing bail pivotally connected with said plate, a plow connected with said bail, and means for adjusting one end of said plate vertically with relation to the other end.

9. The combination with a tractor, of a plate secured thereto, a bail pivotally connected with said plate, a plow connected with said bail, and means for adjusting one end of said plate vertically with relation to the other end to level the plow.

10. The combination with a tractor, of a plate having horizontal slots near one end and vertical slots near the other end, bolts passing through said slots and adjustably securing the plate to the tractor, a trailing bail pivotally connected with said plate, and a plow connected with the rear end of said bail.

11. The combination with a tractor, of a plate having horizontal slots near one end and vertical slots near the other end bolts passing through said slots and securing the plate to the tractor, a bracket disposed between said plate and the tractor and having holes for the bolts which pass through the vertical slots, an adjusting rod connecting said bracket with the plate, a trailing bail pivotally connected with said plate, and a plow having its forward end connected with said bail.

12. The combination with a tractor, a trailing bail pivotally connected therewith, means supported by said tractor for raising and lowering said bail, and a gang of plows, of coupling devices between said bail and gang, means for adjusting said coupling devices laterally with respect to the gang, and means for adjusting said coupling devices laterally on the bail.

13. The combination with a tractor, and a trailing bail pivotally connected therewith, of a horizontal bar, a plurality of plows rigidly secured to said bar, and coupling devices secured to said bar and pivotally connected with the rear end of the bail.

14. The combination with a tractor, a trailing bail pivotally connected therewith, and a plurality of plows connected with said bail, of means for adjusting one side of said bail vertically with respect to the other side, and braces connecting the side members of said bail.

15. The combination with a tractor, and a rigidly cross-braced trailing bail pivotally connected therewith, of a horizontal bar, a plurality of plows rigidly secured to said bar, and coupling devices secured to said bar and pivotally connected with the rear end of the bail.

16. The combination with a tractor, and a trailing bail pivotally connected therewith, of a horizontal bar, a plurality of plows connected rigidly with said bar, coupling devices adjustably secured to said bar, said coupling devices including a vertical pivot member pivotally connected with the rear end of the bail.

17. The combination with a tractor, and a gang of plows, of a bail pivotally connected with said tractor, arms connected with said gang, a vertical post pivotally mounted between said arms, horizontal bearings carried by said post and loosely connected with the rear end of the bail, and a stop on the bail to prevent lateral displacement of said horizontal bearings on the bail.

18. The combination with a tractor and a rigidly connected gang of plows, of a horizontal bar with which said gang is connected, a trailing bail pivotally connected at one end to the tractor with horizontal pivots, and means including vertical and horizontal pivots connecting the opposite end of the trailing bail with said horizontal bar.

19. The combination with a tractor and a plurality of plow bodies rigidly connected together, and a horizontal bar with which said plow bodies are connected, of draft mechanism pivotally connected at one end to the tractor, coupling devices connected with the rear end of said draft devices, said coupling devices comprising a vertical pivot connected with the draft devices and a horizontal pivot connected with said horizontal bar, whereby the plurality of plow bodies will be caused to move simultaneously in either a vertical or a horizontal direction.

In testimony whereof, I have signed this specification in the presence of two subscribing witnesses.

EDWARD M. HEYLMAN.

Witnesses:
 EDWIN NICAR,
 KATE E. BUCKLEY.